UNITED STATES PATENT OFFICE.

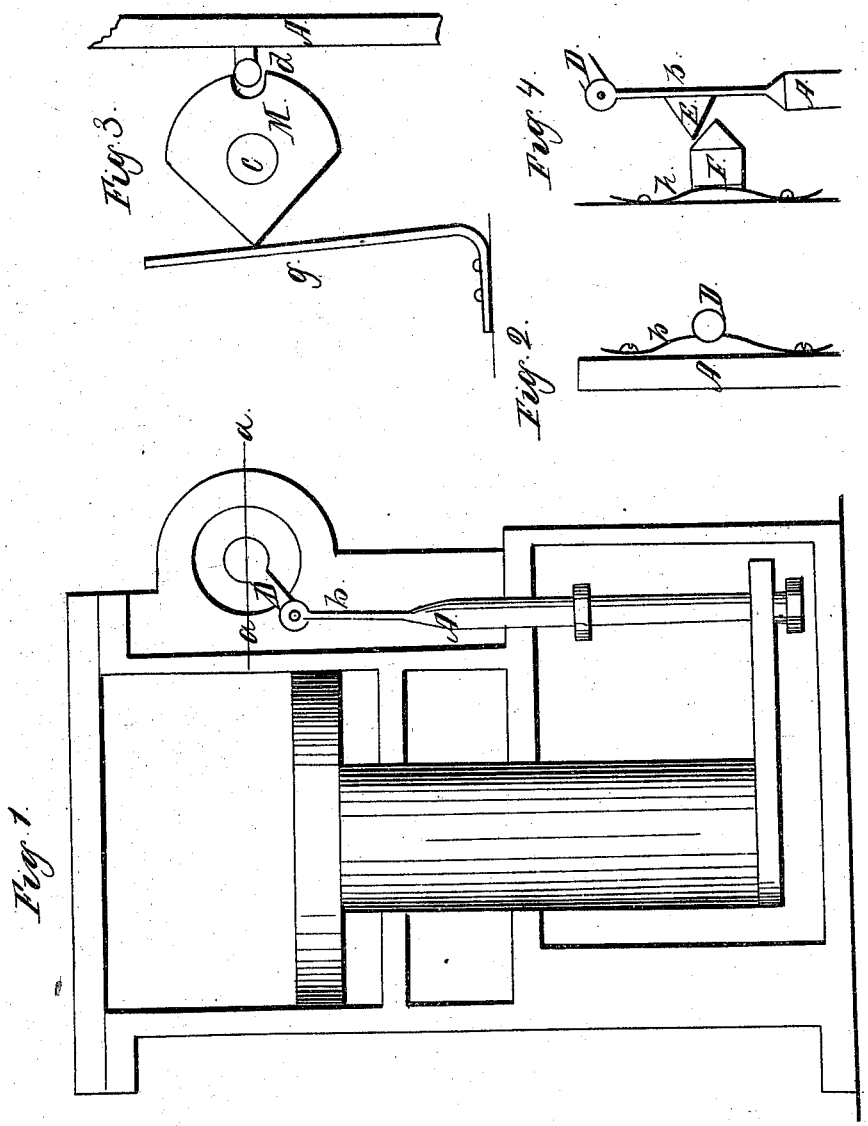
G. H. & C. P. Dean & J. B. Gardner.
Steam Cut Off.
No. 87,550. Patented Mar. 9, 1869.

GEORGE H. DEANE, CHARLES P. DEANE, AND J. B. GARDINER, OF SPRINGFIELD, MASSACHUSETTS.

IMPROVEMENT IN DIRECT-ACTING STEAM-ENGINES.

Specification forming part of Letters Patent No. 87,550, dated March 9, 1869; antedated December 21, 1868.

*To all whom it may concern:*

Be it known that we, GEORGE H. DEANE, CHARLES P. DEANE, and J. B. GARDINER, of Springfield, Hampden county, Commonwealth of Massachusetts, and of the firm of Gardiner & Co., have invented certain new and useful Improvements in Engines for Steam-Pumps and other purposes; and we hereby declare that the following is a full and exact description thereof, reference being had to the accompanying drawings, and to letters of reference marked thereon.

In the drawings, Figure 1 shows the arrangement of our invention. Fig. 2 shows a variation of the same. Figs. 3 and 4 show devices for assisting the action of the valve-gear, as shown in Fig. 1.

In Fig. 1 our improvement is shown attached to the plunger of a single-acting steam-pump, which is directly attached to and forms a part of the piston of an engine operating the said plunger directly from the steam-piston.

Our invention relates to the valve-gear of that class of engine in which the valve is brought nearly to its "dead-point" by the action of the steam-piston, and is carried over by a spring which has previously been compressed by the action of the piston.

The spring may be of various forms, and may be attached in various ways to the engine, so as to act properly on the valve to carry the valve over its dead-point; but our invention is more simple and sure in its operation than any arrangement for the purpose known to us.

It consists in the construction of the spring either by the valve-rod being flattened or by being attached to the same; and, further, if desired to assist the operation, the use of cams, as hereafter shown, may be resorted to.

We prefer to use a simple "plug"-valve, whereby to avoid undue friction.

The operation of these devices is apparent from the drawings. As the valve-rod is moved by the tappet attached to the piston, the lever or crank-arm D is moved until it reaches its dead-point at the line *a*, and being moved a little beyond this line the spring *b* (which has been compressed in the movement of the valve-arm to this point) begins to act upon the arm, and carries it on until the spring resumes its perpendicular position, carrying the valve to the proper position to reverse the engine.

The arm D has sufficient "lost motion" on the valve to allow the arm to be brought to the line *a* previous to the valve reaching its dead-point. If preferred, this spring may be attached to the valve-rod, as shown in Fig. 2, and in some cases the action of the same may be assisted by cams, as shown in Figs. 3 and 4. Fig. 4 shows two cams, so arranged as to assist the crank-arm to compress the spring. This device may also be used independently of the spring in or on the valve-rod by attaching the cam E to the rod and placing a spring behind the cam F.

Fig. 3 shows a cam turning upon a pivot, *c*, operated by a pin, *d*, attached to the valve-rod, and acting upon a spring, *g*, to compress and receive motion from it. This device may also be used independently of the valve-rod spring, although both this and the one shown in Fig. 4 work much better in combination with the same.

And now, having described our invention, what we claim as new, and desire to secure by Letters Patent, is—

1. The construction and arrangement of the spring *b*, as shown, forming a part of or directly attached to the valve-rod, substantially as shown and described.

2. The arrangement of the cams E and F, in combination with the valve-rod A and spring *b*, constructed substantially as described.

3. The arrangement of the spring *h* behind the cam F, the cam E being attached to the valve-rod, which is constructed substantially as shown.

4. The arrangement of the projection *d* on the valve-rod, pivoted cam M, and spring *g*, substantially in the manner described.

GEO. H. DEANE.
      CHARLES P. DEANE.
      J. B. GARDINER.

Witnesses:
 E. H. HYDE,
 R. F. HYDE.